United States Patent [19]

Knapick et al.

[11] Patent Number: 5,807,465
[45] Date of Patent: Sep. 15, 1998

[54] GRANULAR MATERIAL CONTAINING RECYCLED PAPER COMPONENTS

[75] Inventors: Edward G. Knapick, Ogdensburg; Brent Willemsen, Westfield; Ernest P. Wolfer, Allendale, all of N.J.

[73] Assignee: Marcal Paper Mills, Inc., Elmwood Park, N.J.

[21] Appl. No.: 857,302

[22] Filed: May 16, 1997

Related U.S. Application Data

[63] Continuation of Ser. No. 482,843, Jun. 7, 1995, abandoned, which is a continuation-in-part of Ser. No. 118,186, Sep. 9, 1993, abandoned.

[51] Int. Cl.$^6$ .................................................... D21H 23/00
[52] U.S. Cl. ............................ 162/100; 119/172; 428/372
[58] Field of Search .................................... 119/172, 173; 210/924, 503, 504, 505, 502.1; 162/100, 189; 502/404; 428/402, 372, 326, 398

[56] References Cited

U.S. PATENT DOCUMENTS

| | | |
|---|---|---|
| 622,054 | 3/1899 | Marsden . |
| 888,148 | 5/1908 | Kokkenwadel . |
| 892,754 | 7/1908 | May . |
| 907,403 | 12/1908 | Redfearn . |
| 966,060 | 8/1910 | Severns . |
| 1,758,735 | 5/1930 | Conrad . |
| 2,182,274 | 12/1939 | Baker et al. . |
| 2,198,013 | 4/1940 | Olcott . |
| 2,287,759 | 6/1942 | Hardesty et al. . |
| 2,877,599 | 3/1959 | Hebestreet et al. . |
| 2,880,519 | 4/1959 | Pollock . |
| 2,952,866 | 9/1960 | Sackett . |
| 3,003,911 | 10/1961 | Lindstrom et al. . |
| 3,011,876 | 12/1961 | Raistrick . |
| 3,047,453 | 7/1962 | Shook, Jr. . |
| 3,059,615 | 10/1962 | Kuceski et al. . |
| 3,142,862 | 8/1964 | Guldman . |
| 3,188,751 | 6/1965 | Sutton . |
| 3,235,444 | 2/1966 | Kruger . |
| 3,252,785 | 5/1966 | Hoblit . |
| 3,256,857 | 6/1966 | Karras . |
| 3,381,460 | 5/1968 | Sokolowski . |
| 3,449,106 | 6/1969 | Paden et al. . |
| 3,506,536 | 4/1970 | Jacquelin . |
| 3,564,083 | 2/1971 | Fournet et al. . |

(List continued on next page.)

FOREIGN PATENT DOCUMENTS

| | | |
|---|---|---|
| 2090665 | 10/1993 | Canada . |
| 0 039 522 | 11/1981 | European Pat. Off. . |
| 0111467 | 6/1984 | European Pat. Off. . |
| 1 454 743 | 1/1969 | Germany . |
| 23 58 808 | 6/1975 | Germany . |
| 30 17 352 | 11/1981 | Germany . |
| 33 43 965 | 12/1984 | Germany . |
| 4130472 | 3/1993 | Germany . |
| 52-45595 | 4/1977 | Japan . |
| 52-62189 | 5/1977 | Japan . |
| 53-51662 | 5/1978 | Japan . |
| 293892 | 7/1928 | United Kingdom . |

*Primary Examiner*—Brenda A. Lamb
*Attorney, Agent, or Firm*—Burns, Doane, Swecker & Mathis, L.L.P.

[57] ABSTRACT

A process is disclosed which utilizes the "non-papermaking" portion of waste paper to produce a highly absorbent, essentially fiber-free granule which can be used, for example, as an agricultural chemical carrier. The process maximizes the amount of long (papermaking) fiber sent to the paper machine. The waste paper is broken up in a hydropulper, and the pulp stock is screened so that papermaking fibers are retained and sent forward to the papermaking process, and the solid material in the reject stream, such as kaolin clay and inorganic materials pass through a flotation clarifier to separate the solids. The slurry is then dewatered by means of a belt press to form a filter cake. The filter cake then enters a pin mixer where it is broken up into individual granules. The granules are then dried to a solids content of greater than 95%.

9 Claims, 2 Drawing Sheets

U.S. PATENT DOCUMENTS

| | | |
|---|---|---|
| 3,574,050 | 4/1971 | Rice . |
| 3,589,977 | 6/1971 | Fournet . |
| 3,672,945 | 6/1972 | Taylor . |
| 3,675,625 | 7/1972 | Miller et al. . |
| 3,723,321 | 3/1973 | Thomas . |
| 3,747,564 | 7/1973 | Bickoff et al. . |
| 3,789,797 | 2/1974 | Brewer . |
| 3,828,731 | 8/1974 | White . |
| 3,900,547 | 8/1975 | Hunt et al. . |
| 3,904,726 | 9/1975 | Jacquelin et al. . |
| 3,916,831 | 11/1975 | Fisher . |
| 3,921,581 | 11/1975 | Brewer . |
| 3,929,446 | 12/1975 | Trocino . |
| 3,942,970 | 3/1976 | O'Donnell . |
| 3,980,050 | 9/1976 | Neubauer . |
| 4,106,991 | 8/1978 | Markussen et al. . |
| 4,108,932 | 8/1978 | Takewell et al. . |
| 4,116,760 | 9/1978 | Kennedy . |
| 4,134,725 | 1/1979 | Büchel et al. . |
| 4,137,029 | 1/1979 | Brooks . |
| 4,148,952 | 4/1979 | Nelson et al. . |
| 4,157,696 | 6/1979 | Carlberg . |
| 4,163,674 | 8/1979 | Been . |
| 4,203,388 | 5/1980 | Cortigene et al. . |
| 4,225,382 | 9/1980 | Kearney et al. . |
| 4,241,001 | 12/1980 | Lamond et al. . |
| 4,263,873 | 4/1981 | Christianson . |
| 4,269,859 | 5/1981 | Morse . |
| 4,277,328 | 7/1981 | Pfalzer et al. . |
| 4,305,345 | 12/1981 | Otoguro . |
| 4,311,115 | 1/1982 | Litzinger . |
| 4,341,100 | 7/1982 | Cortigene . |
| 4,343,680 | 8/1982 | Field et al. . |
| 4,343,751 | 8/1982 | Kumar . |
| 4,356,060 | 10/1982 | Neckermann et al. . |
| 4,374,794 | 2/1983 | Kok . |
| 4,378,756 | 4/1983 | Whiteman . |
| 4,407,231 | 10/1983 | Colborn et al. . |
| 4,409,925 | 10/1983 | Brundrett et al. . |
| 4,438,263 | 3/1984 | Morse . |
| 4,458,629 | 7/1984 | Gerber . |
| 4,459,368 | 7/1984 | Jaffee et al. . |
| 4,492,729 | 1/1985 | Bannerman et al. . |
| 4,495,482 | 1/1985 | Philipp . |
| 4,497,688 | 2/1985 | Schaefer . |
| 4,537,877 | 8/1985 | Ericsson . |
| 4,560,527 | 12/1985 | Harke et al. . |
| 4,619,862 | 10/1986 | Sokolowski et al. . |
| 4,621,011 | 11/1986 | Fleischer et al. . |
| 4,664,064 | 5/1987 | Lowe . |
| 4,712,508 | 12/1987 | Lowe . |
| 4,721,059 | 1/1988 | Lowe et al. . |
| 4,734,393 | 3/1988 | Lowe et al. . |
| 4,832,700 | 5/1989 | Kaspar et al. . |
| 4,888,092 | 12/1989 | Prusas et al. . |
| 4,915,821 | 4/1990 | Lamort . |
| 4,930,443 | 6/1990 | Lowe, Jr. et al. . |
| 4,931,139 | 6/1990 | Phillips . |
| 4,983,258 | 1/1991 | Maxham . |
| 5,002,633 | 3/1991 | Maxham . |
| 5,019,564 | 5/1991 | Lowe et al. . |
| 5,094,604 | 3/1992 | Chavez et al. . |
| 5,146,877 | 9/1992 | Jaffee et al. . |
| 5,176,822 | 1/1993 | Iwashige et al. . |
| 5,196,473 | 3/1993 | Valenta et al. . |
| 5,352,780 | 10/1994 | Webb et al. . |
| 5,358,607 | 10/1994 | Ellis ........................................ 162/100 |

GRANULAR MATERIAL CONTAINING RECYCLED PAPER COMPONENTS

RELATED APPLICATION

This application is a continuation of application Ser. No. 08/482,843, filed Jun. 7, 1995 now abandoned, which is a continuation-in-part application of Ser. No. 08/118,186, filed Sep. 9, 1993, now abandoned.

FIELD OF THE INVENTION

The present invention relates to recycling wastepaper, and more particularly to recycling processes for recovering papermaking fibers and for making absorbent granular materials from wastepaper.

BACKGROUND OF THE INVENTION

It has been common practice for many years to make paper, especially tissue, from recycled paper. Paper recycling has in recent years become an important and attractive alternative to disposal of wastepaper by deposition in landfills or by incineration. When the wastepaper source includes a significant amount of coated paper, as much as 30–45% of the original wastepaper will be reject material which is unusable for papermaking. This reject material has typically been discarded in landfills. Increasing costs and decreasing availability of landfill space makes it desirable to find beneficial uses for this reject material.

In the process of recycling waste paper, such as newspapers, magazines, office paper waste, the paper fibers are separated from the other solid components by using large quantities of water. The printing materials, such as laser print, photocopier print and ink, are removed before the paper fibers are conducted to the papermaking machine. Usually, these rejected solid materials are discharged with the water into large settling basins. The solid materials that settle out in the basins are then dumped in a landfill, or otherwise discarded. The material that settles out in the basins is known as paper mill sludge.

The increasing cost of wastepaper makes it desirable to capture as much of the papermaking fibers as practicable. In view of the large quantities of water required for papermaking, it is important to use a process that conserves water. There have been various proposals for systems for utilizing rejected solid materials such as paper mill sludge to produce absorbent granules and other products. Kaolin clay is one of the rejected solid materials that has been recognized as having good absorbent capabilities.

Conventional absorbent granules are produced from naturally occurring clay and are commonly used as agricultural chemical carriers. However, some of the agricultural chemicals (e.g., Diazinon) react with clay carriers. Accordingly, it would be advantageous to develop an agricultural chemical carrier that contains clay, but does not react with agricultural chemicals. Also, naturally occurring clays tend to create dust during handling. This is potentially hazardous to workers.

SUMMARY OF THE INVENTION

It is an object of the present invention to provide an efficient and economical wastepaper recycling process for recovering fibers for use in papermaking and producing useful granular products from the reject stream. It is another object of this invention to produce a granular product that has high absorbency, is free flowing, substantially dust free and has high resistance to attrition. A further object is to produce a material of broad utility as a water and oil absorbent.

The process of this invention utilizes wastepaper, preferably office waste that is printed with laser print, photocopier print, or other inks, as well as stationery and magazines that have a coated surface. The wastepaper is pulped with water, caustic and surfactants to produce a slurry containing cellulose fibers, cellulose fines and fillers. The slurry passes through wire washers which separate papermaking fibers from the fines and fillers. Papermaking fibers are a mixture of long and short fibers, although it is recognized that some of the short fibers will pass through the screens. For the purposes of this description, long fibers are greater than about 1 mm in length and short fibers are between about 1 mm and about 0.1 mm in length. The papermaking fiber stream, also referred to as the "accepts stream", is directed through a cleaning and deinking step and then to a conventional papermaking machine for processing into paper. Separately, various streams from the papermaking machine and other sources are passed through a fiber recovery system where a series of wire washers separate papermaking fibers from these streams, sending the papermaking fibers back to the cleaning and deinking stages. The rejects from this fiber recovery system contain essentially the same solid materials as the first reject stream mentioned above. These reject streams are combined and sent to a flotation clarifier where a flocculating polymer is added and air is injected to cause the suspended solids (fines and fillers) to be concentrated as a flotate. Clarified water is removed from the clarifier for reuse in the process.

In order to sterilize the absorbent material, the flotate stream is pasteurized at a minimum temperature of 160 degrees F., and then a second flocculating polymer is added to the flotate stream. This flotate stream then passes through a belt press or similar dewatering device where the water content is further reduced. The filter cake from the belt press is in the form of a gray, wet cake. The wet cake then passes to a size reducer where the material is broken up. The wet granules are then sent through a conveyor dryer to produce dry granules of irregular shape and having good absorbent characteristics.

The granules produced by this process have a high liquid holding capacity. The term granules is intended to include small particles and chunks that may be as large as 0.5 inches across. Their composition, by weight, is approximately 35–50% inorganic fillers (kaolin clay, calcium carbonate, titanium dioxide) and 50–65% organic (cellulose fines, starches, tannins, lignin, etc.). Less than 10% of the cellulosic material in the granules is in the form of fibers greater than 1 mm in length. The granules are free flowing and resistant to attrition. The bulk density of the granules is between about 28–38 lbs./cu.ft. These granules are useful as oil and water absorbents as well as carriers for agricultural chemicals.

DESCRIPTION OF THE DRAWINGS

A preferred embodiment of the invention is illustrated in the accompanying drawings, in which.

DETAILED DESCRIPTION

The process of this invention utilizes wastepaper that is collected from offices or other sources that contain primarily recyclable paper grades, including magazines (with clay and calcium carbonate based coatings) and printed paper such as paper used for laser printing, photocopying and other paper.

Figure 1:
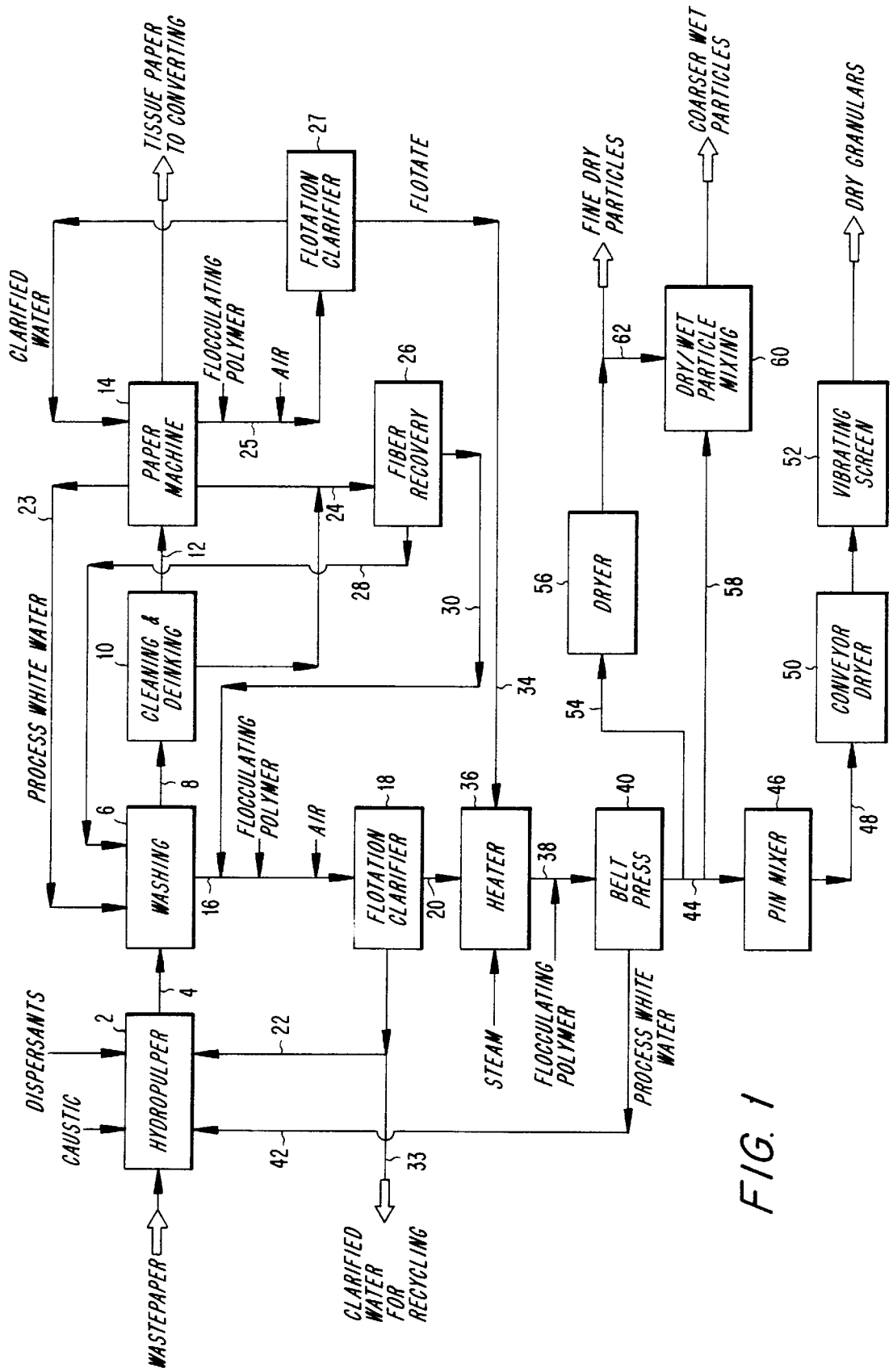
FIG. 1 is a schematic view of the process and apparatus for recovering the papermaking fibers and manufacturing the granules according to the present invention.

Referring to FIG. 1, wastepaper is supplied to a hydropulper 2 along with water, caustic agents, such as sodium hydroxide, and dispersants to separate the fiber from the other components of the wastepaper. Plastics, debris and other foreign objects are removed by conventional means. The pulp slurry from the hydropulper, which contains more than 95% water, passes through a pipe 4 to a washer 6 where several conventional washing steps are performed. In the washer 6, the slurry flows over wire screens where fibers useful for papermaking pass across the screens and the reject stream passes through the screens and is conducted out of the washer through a pipe 16. The screens have slotted openings of about 100 to 300 microns in width. Preferably, the screens are semi-cylindrical and the slurry is sprayed tangentially onto the screens. Fibers suitable for papermaking pass across the surface of the screens, while small particles, such as kaolin clay, cellulose fines and other suspended solids pass through the screens. Some of the fibers may also pass endwise through the screens. The papermaking fibers from the surface of the screen are included in the accepts stream that is pumped through the pipe 8 and are subject to further cleaning, deinking and processing, indicated at 10, before being supplied through a pipe 12 to a papermaking machine 14.

The reject stream from the washer 6 is in the form of a slurry containing less than 1.5% solids. Typically, 50% by weight of the solids are fillers such as kaolin clay, calcium carbonate and titanium dioxide. The remaining 50% is mostly sugars, tannins, lignins, and cellulose fiber or fines, which is referred to generally herein as cellulosic material. To the extent there are cellulose fibers in the reject stream, most of these fibers are less than 1 mm in length. This slurry, which contains at least 98.5% water, is conducted through the pipe 16 to a dissolved air flotation clarifier 18. Suitable clarifiers are commercially available (e.g., Supracell from Krofta, or Deltafloat from Meri). A flocculating polymer, such as Drewfloc 441 from Drew Chemical Co., or Calgon TRP 945, is added to the reject stream in the pipe 16 before the slurry enters the clarifier. Air is injected into the feed stream of the clarifier 18. The slurry fills the clarifier 18, and the flocculated suspended solids float on the air bubbles to the surface of the clarifier. At this point, the mat of solids, which has a consistency of 3–9%, is skimmed or raked off the surface and removed from the clarifier through the pipe 20. The clarified water from the clarifier 18 is conducted back into the hydropulper 2 through the pipe 22 to be reused and a portion of the clarified water is recycled via pipe 33 to other places in the mill.

In accordance with this invention, nearly all unscreened mill process effluents that contain papermaking fibers are treated in a fiber recovery unit 26. Here the stream passes through screens that separate the papermaking fibers from fillers such as kaolin clay, cellulose material, sugars, lignins, tannins, etc., in a manner similar to the washer 6. This effluent includes some reject water streams, dumping or spills from pulp and paper chests, plant wash-ups, etc., indicated as stream 24 in FIG. 1. Previously, this effluent would have been discharged to a sewer. Papermaking fibers are returned through pipe 28 from the fiber recovery unit 26 to the washer 6. Pipe 30 conducts the reject stream from the fiber recovery unit 26 to the clarifier 18.

The white water stream 25 from the papermaking machine is supplied to another flotation clarifier 27 where the flocculated suspended solids are removed in the same manner as in the clarifier 18. Process white water stream 23 is returned to the washer 6.

The flotate from the clarifiers 18 and 27 is supplied to a heater 36 through pipes 20 and 34 respectively. The heater 36 may be of any suitable type, such as a steam injection unit, or a heat exchanger. The flow rate of the stream and the heat applied should be sufficient to raise the temperature of the stream for sufficient time to achieve pasteurization of the stream. Preferably, the stream should be heated to a temperature of at least 160° F.

The stream passes out of the heat exchanger 36 through a pipe 38, and a second polymer (such as Drewfloc 453 from Drew Chemical Co.) is added to the slurry to cause the solids to dewater as the slurry enters a belt press 40. The belt press can be any one of the commercially available units (e.g., Kompress Belt Filter Press, Model GRS-S-2.0 from Komline Sanderson). At the outlet of the belt press, the filter cake contains 35–40% solids. Process white water from the belt press is returned to the hydropulper 2 through the pipe 42.

If a filter cake having a higher solids content is desired, a screw press may be used after the belt press, or instead of the belt press. Alternatively, a belt press with compressive rolls can be employed. The filter cake would pass through the nip between the rolls for additional dewatering. These arrangements can be used to produce a filter cake having a solids content of up to 45%.

If small particles are desired as the final product, the filter cake from the belt press 40 is conveyed by a screw conveyor 44 to a pin mixer 46 (such as the Turbulator from Ferro-Tech). The pin mixer has a cylindrical shell and a rotatable shaft mounted on the central axis of the shell. The shell is stationary and is supported on a frame so that the central axis of the shell is horizontal. The shaft has radial pins that are spaced about ⅛" from the interior wall of the shell. Pieces of the filter cake from the conveyor 44 are deposited in the shell at one end of the shell. The rate of filling of the shell should be adjusted so that the cake material occupies only about 2% of the volume of the shell. By maintaining a low density in the pin mixer 46, the filter cake is broken up by the rotating pins so that individual granules are separated as the material progresses from the inlet of the pin mixer to the outlet. It has been found that the pin mixer 46 produced optimum size particles for use as an agricultural carrier by running in the middle of its speed range, which is at 1500–4500 feet per minute tip speed of pins. Higher speeds give larger particles. Lower speeds yield a larger variability in sizes, with no net increase in smaller sized granules. It has been discovered that, when operating the mixer with a partially filled chamber in the middle of its speed range, the pin mixer 46 reduces the size of the particles as compared to the size of the particles that are discharged from the screw conveyor 44.

Figure 2:
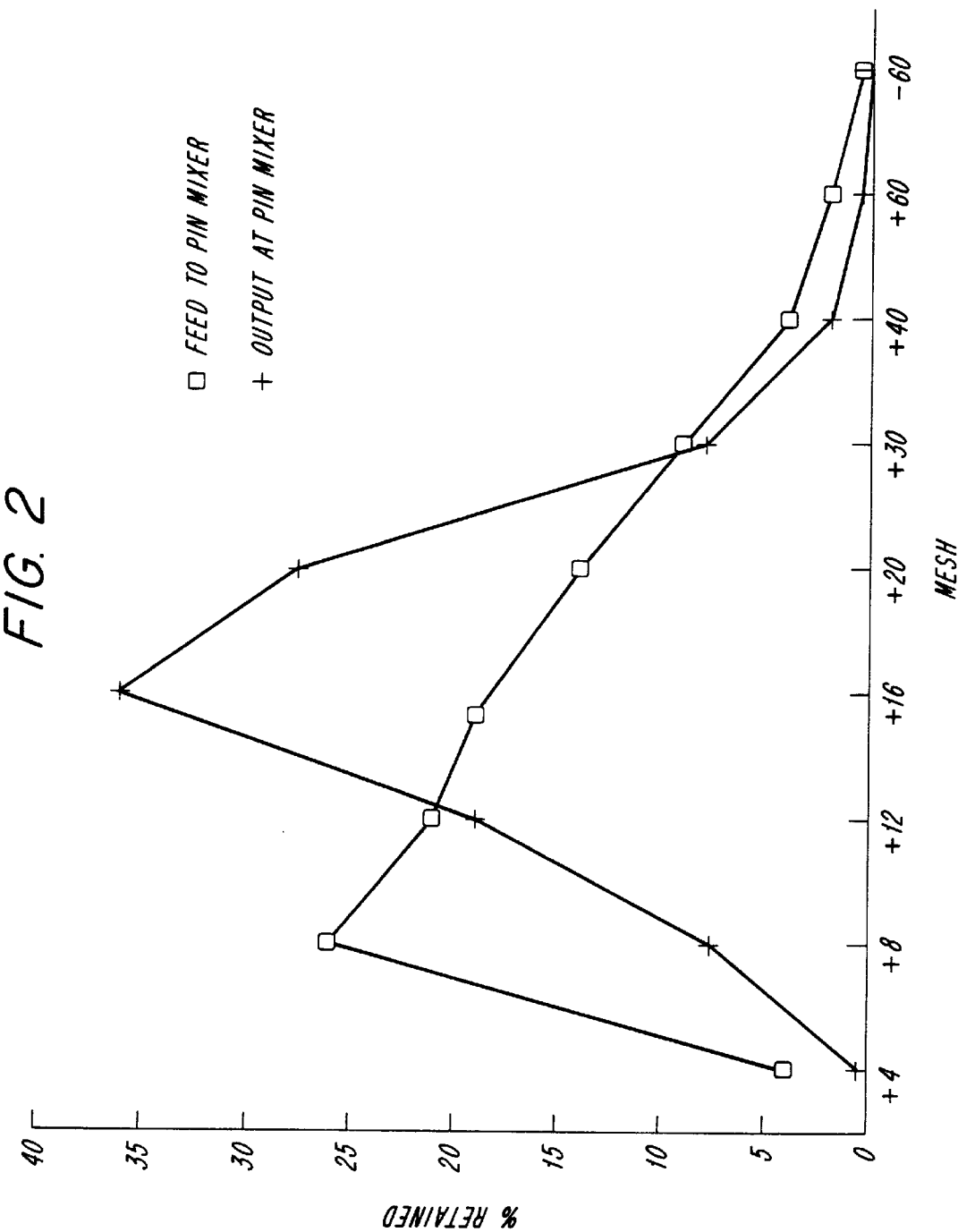
FIG. 2 is a graph of the particle size distribution of the material before and after the pin mixer.

The effect of the pin mixer 46 on the particle size is shown in FIG. 2, which compares the percent of particles retained on screens of progressively smaller openings (higher mesh numbers). As shown in FIG. 2, a substantially greater percentage of the particles that are discharged from the pin mixer 46 have a smaller size than the particles entering the pin mixer 46. Another way of stating this is that FIG. 2 shows that only 8% of the particles discharged from the pin mixer 46 have a size large enough to be retained on a #8 mesh screen or larger (e.g., #4), while 25% of the particles supplied to the pin mixer have a size large enough to be retained on a #8 mesh screen or larger. Additives may be added at this point (e.g., to increase density or absorbency) but it is important not to increase the water content of the press cake since this would cause the particles to agglomerate, yielding a larger than desirable particle size and a less absorbent product. Operating the pin mixer in this fashion allows for uniform densification of the granules. It has been found that backmixing dried granules with the wet feed prior to the pin mixer also leads to a smaller, denser granule.

Preferably, up to 50% by weight of the dried granules can be added. No additional binders are necessary since the matrix produced by the kaolin clay, along with the lignin, tannin, starch and short fibrils starch and short fibrils in the feedstock, serve as the binder for the granules. The resulting open pore structure yields an absorbent irregular particle.

From the pin mixer 46, the granulated but still moist material moves, preferably under the force of gravity, onto a swing conveyor 48, to the belt of a conveyor dryer 50, such as a Proctor & Schwartz two-zone conveyor dryer. The belt is porous and a fan blows hot air through the belt to dry the granules. The velocity of the air flow is sufficiently low to avoid movement of the granules on the belt. At the outlet, the granules have a minimum solids content of 90% by weight, and preferably greater than 95%.

Vibrating screens 52, such as manufactured by Sweco, are used to classify the material by size according to product specifications.

Alternatively, instead of supplying filter cake to the pin mixer 46, the filter cake from the belt press 40 may be conveyed by a conveyor 54 to a dryer 56, such as a Komline Sanderson paddle-type dryer, as shown schematically in FIG. 1. In the dryer 56, the filter cake particles are further dried and may be ground into fine dry particles. The dried particles may have any desired solids content depending on the time and extent of drying. Preferably, the particles have a solids content of 90 to 100% by weight. Even more preferably, the particles have a solids content of 96 to 99% by weight. Also, the particles desirably have a bulk density of from 45 lbs/ft$^3$ to 50 lbs/ft$^3$ and a size ranging from 4 to 300 mesh.

The particles from dryer 56 may be used directly as a product, or optionally mixed with wet filter cake particles at the dry/wet particle mixing stage 60. The dry particles from dryer 56 are conveyed through 62. The wet particles are conveyed through 58. Alternatively, the dried particles from dryer 56 may be returned to the main conveyor 44 and mixed with the filter cake particles to produce a final product. Preferably, the dry/wet particle mixing whether in a separate mixing stage 60 or in the main conveyor 44 provides a product having a solids content of from 40 to 60% by weight, preferably 45 to 50% by weight. Alternatively, the wet particles from the belt press 40 may be used directly with little or no mixing of dry particles. The particles used as a final product either with or without addition of dry particles from the dryer 56 have a bulk density of from 50 lbs/ft$^3$ to 60 lbs/ft$^3$ and a size ranging from 4 to 100 mesh. The mixing ratio of dry particles from dryer 56 to wet particles from belt press 40 ranges from 0 to 50% by weight, preferably 5 to 30% by weight.

The purpose of the heater 36 is to prevent the growth of bacteria in the material produced by this process. If the filter cake or the granules from the pin mixer 46 are conducted through a dryer, as described above, the heater 36 may be omitted since any bacteria will be killed in the dryer. However, if coarse wet particles are produced, it is necessary to kill the bacteria. An alternative to the heater 36 would be the use of a stationary horizontal cylinder with a rotating auger that would advance the particles through the cylinder. Steam injected into the cylinder would heat the material sufficiently to cause the bacteria to be killed.

The granules produced by this process contain approximately 50% by weight of organic materials, such as cellulosic fines, starches, tannins and lignins. The granules contain less than 10% fiber by weight over 1 mm in length. The inorganic fillers comprise about 50% by weight of the granules and are made up primarily of kaolin clay, calcium carbonate and titanium dioxide. The granules have a substantially uniform density throughout. The granules have an irregular, generally spherical shape and have a porous outer surface. The granules from the conveyor dryer 50 vary in size. Typically, about 50% will be retained on an 8×16 mesh screen, i.e., 50% would pass through an U.S. Sieve No. 8 mesh screen but would be retained on a 16 mesh screen. Typically, the remaining portion would be about 40% in the 16×30 mesh size range, and about 10% in the 20×60 mesh size range. The granules have a bulk density of about 30–40 lb./cu. ft. Bulk density can be increased by adding prior to the pin mixer a densifier such as Barium Sulfate.

The granular material according to the present invention is able to withstand agitation such as might occur during shipment, handling, and storage. Resistance to attrition of the granules is between 90 and 95%. This percentage is based on the following test procedure. A weight of 75 grams of sample is shaken on a limiting screen for ten minutes and 50 grams of the material retained is then shaken in a pan for ten minutes with ten steel balls (⅝" in diameter). The entire sample is then shaken on the limiting screen for ten minutes. The percentage of the original 50 grams retained on the limiting screen is the resistance to attrition cited above. Granular material according to the present invention has been found to generally have a pH between 8.5–9.4.

Granular material according to the present invention is adapted to absorb various liquids to desired degrees as a function of percentage of weight of the granules. When the granular material according to the present invention is intended for use as an agricultural carrier, it has a liquid holding capacity (LHC) toward odorless kerosene of between 25–29%. The material for use as a floor absorbent, when tested with material retained on an 8×35 mesh, is able to absorb about 70–80% of its weight of water, and about 50–60% of its weight of oil.

Since particles or granules used as an agricultural carrier are preferably small, the use of the pin mixer is an effective way to obtain smaller particles in an efficient manner. It has also been found that the particles produced using the pin mixer have less tendency to produce dust during the treatment and storage of the dry particles than naturally occurring clay. This is particularly important when the particles are used as an agricultural carrier because of the presence of herbicides or pesticides that may adversely affect workers if substantial amounts of dust are present. These granules are also useful as oil and grease absorbents and as pet litter.

While this invention has been illustrated and described in accordance with preferred embodiments, it is recognized that variations and changes may be made therein without departing from the invention as set forth in the claims.

What is claimed is:

1. An absorbent material comprising irregularly shaped generally spherical granules containing about 50–65% organic solids including cellulose fibers and about 35–50% inorganic solids including kaolin clay and calcium carbonate, and having a substantially uniform density throughout, and wherein the granules have a porous outer surface.

2. The absorbent material according to claim 1, wherein the granules are of a size that at least one-half of the granules would pass through an 8-mesh screen and be retained on a 16-mesh screen, the balance of the granules being a smaller size.

3. The absorbent material according to claim 1, wherein the granules contain less than 10% fibers by weight with a length greater than 1 mm.

4. The absorbent material according to claim 1, wherein the granules have a resistance to attrition of at least 90%.

5. The absorbent material according to claim 1, wherein the granules have a bulk density of about 30 to about 40 lb./cu.ft.

6. An absorbent material comprising irregularly shaped generally spherical granules containing inorganic fillers, including kaolin clay and containing organic materials, including cellulose fibers; the granules containing less than 10% cellulose fibers with a length greater than 1 mm, and the granules having a porous outer surface.

7. The absorbent material according to claim 6, wherein the granules are of a size such that at least one-half of the granules would pass through an 8-mesh screen and be retained on a 16-mesh screen, the balance of the granules being of a smaller size; and the granules having a resistance to attrition of at least 90%.

8. The absorbent material according to claim 6, wherein the granules have a liquid holding capacity toward odorless kerosene of between about 25% and about 30%.

9. The absorbent material according to claim 6 wherein the granules have a substantially uniform density and a size between 8-mesh and 35-mesh and have the ability to absorb between about 70% and about 80% of its weight in water and between about 50% and about 60% of its weight in oil.

* * * * *